(12) United States Patent
Hasegawa et al.

(10) Patent No.: US 6,316,126 B1
(45) Date of Patent: Nov. 13, 2001

(54) ALUMINUM ALLOY CLAD MATERIAL FOR HEAT EXCHANGERS EXHIBITING EXCELLENT EROSION-CORROSION RESISTANCE

(75) Inventors: Yoshiharu Hasegawa, Obu; Haruhiko Miyachi, Okazaki; Hisao Kato, Nagoya; Hirokazu Tanaka, Tajimi; Hiroshi Ikeda; Yoshifusa Shoji, both of Nagoya, all of (JP)

(73) Assignees: Denso Corporation, Kariya; Sumitomo Light Metal Industries, Ltd., Tokyo, both of (JP)

( * ) Notice: Subject to any disclaimer, the term of this patent is extended or adjusted under 35 U.S.C. 154(b) by 0 days.

(21) Appl. No.: 09/417,803

(22) Filed: Oct. 14, 1999

(30) Foreign Application Priority Data

Feb. 23, 1999 (JP) .................................. 11-044206
Feb. 26, 1999 (JP) .................................. 11-049747

(51) Int. Cl.⁷ ..................................... B32B 15/20
(52) U.S. Cl. .................... 428/654; 138/140; 138/141; 138/143; 428/650; 428/686; 428/457; 428/933
(58) Field of Search .................... 428/654, 650, 428/686, 457, 933; 138/140, 141, 143; 420/548, 549, 553, 540, 528

(56) References Cited

U.S. PATENT DOCUMENTS 4,196,262 * 4/1980 Pryor et al. ........................... 428/654
4,211,827 * 7/1980 Pryor et al. ........................... 428/654
5,350,436 * 9/1994 Takezoe et al. ....................... 420/548

* cited by examiner

Primary Examiner—Robert R. Koehler
(74) Attorney, Agent, or Firm—Flynn, Thiel, Boutell & Tanis, P.C.

(57) ABSTRACT

An aluminum alloy clad material for heat exchangers exhibiting excellent erosion-corrosion resistance, corrosion resistance, pitting resistance, and brazability, which is suitably used as an aluminum alloy clad sheet for forming a constituent member, in particular, a tube for an aluminum heat exchanger such as a radiator and heater, and as a pipe for circulating a working fluid in the aluminum heat exchanger or a pipe connected to the heat exchangers. The aluminum alloy clad sheet comprises a sacrificial anode material clad on one side of a core material, wherein the core material comprises an Al—Mn alloy and the sacrificial anode material comprises an aluminum alloy, for example, an aluminum alloy comprising 3.0–12.0% of Si with the remaining portion consisting of Al and impurities, or an aluminum alloy comprising 3.0–12.0% of Si, 1–10% of Zn, and 0.15–1.2% of Fe with the remaining portion consisting of Al and impurities. The sacrificial anode material may comprise trace amounts of one or more of In, Sn, and Mg. The clad sheet may have a three-layered clad material in which an Al—Si-type brazing material is clad on the side of the core material.

46 Claims, 1 Drawing Sheet

ALUMINUM ALLOY CLAD MATERIAL FOR HEAT EXCHANGERS EXHIBITING EXCELLENT EROSION-CORROSION RESISTANCE

BACKGROUND OF THE INVENTION

1. Field of the Invention

The present invention relates to an aluminum alloy clad material for heat exchangers exhibiting excellent erosion-corrosion resistance. The aluminum alloy clad material comprises an aluminum alloy clad sheet for heat exchangers exhibiting excellent erosion-corrosion resistance which comprises the aluminum alloy clad material and is suitably used for forming a tube material or header plate material in the manufacture of aluminum heat exchangers such as a radiator and heater by brazing in an inert atmosphere using a fluoride-type flux or vacuum brazing, and an aluminum alloy clad pipe comprising the aluminum alloy clad material which is used for tubes for circulating a working fluid in the aluminum heat exchanger such as a radiator and heater and for a pipe connected to heat exchangers, and is mechanically assembled into a fin of a heat exchanger using a pipe expansion method and the like.

2. Description of Background Art

As a tube material or header plate material for an automotive radiator, heater, and the like, a two-layered clad sheet comprising a core material of an Al—Mn alloy such as a 3003 alloy clad with a brazing material of Al—Si alloys or a sacrificial anode material of an Al—Zn alloy or an Al—Zn—Mg alloy on the outer side has been used. In some cases, a three-layered clad sheet comprising a core material of an Al—Mn alloy such as a 3003 alloy clad with a brazing material of an Al—Si alloy on one side and a sacrificial anode material of an Al—Zn alloy or Al—Zn—Mg alloy clad on the other side has been used.

In the manufacture of a radiator or heater, tubes are formed by curving the clad sheet with the brazing material of an Al—Si alloy or the core material being on the outer side and welding or brazing the clad material. The tube is joined to a fin or header plate via the brazing material of the tube material or a brazing material clad on the fin by inert atmosphere brazing using a fluoride-type flux or vacuum brazing. The sacrificial anode material on the inner surface of the tube material exhibits a sacrificial anode effect by being in contact with a working fluid during use to prevent occurrence of pitting or crevice corrosion of the core material. The fin material prevents the core material from pitting by exerting a sacrificial anode effect on the core material.

A clad pipe with a two-layered structure in which an Al—Zn alloy as an inner layer (sacrificial anode material layer) is clad on an Al—Mn alloy such as a 3003 alloy as an outer layer (core material layer), or a clad pipe with a three-layered structure in which an outermost layer (sacrificial anode layer) of an Al—Zn alloy is further clad on the outside the piping material has been also used. In this case, the inner layer of the clad pipe exhibits a sacrificial anode effect on the core material layer of an Al—Mn alloy by being in contact with the working fluid to prevent the core material layer from pitting. In the case of the clad pipe with a three-layered structure, the outermost layer prevents occurrence of pitting or crevice corrosion of the core material layer by exerting a sacrificial anode effect on the core material layer made of an Al—Mn alloy.

As a working fluid for heat exchangers and pipes, a neutral or weak alkaline solution prepared by diluting a commercially available antifreeze fluid containing ethylene glycol as an essential component with water to a concentration of 50 vol % is commonly used. Some working fluids may cause erosion-corrosion in the aluminum alloy clad material (clad sheet and clad pipe) constituting a tube, and the corrosion perforates the core material or core material layer to impair heat exchanging properties.

Some materials for aluminum heat exchangers such as a radiator or heater exhibiting improved pitting resistance have been proposed. One of such materials is an aluminum alloy clad material made of a core material of an Al—Mn alloy containing 0.2–1.5% of Mn, 1.0% or less of Si, and one or more of 0.5% or less of Cu, 0.3% or less of Cr, and 0.2% or less of Zn as required, a brazing material of an Al—Si alloy clad on one side of the core material, and a sacrificial anode material of an aluminum alloy containing 2% or less of Zn clad on the other side of the core material (Japanese Patent Application Laid-open No. 94993/1991). The other example is an aluminum alloy clad material made of a core material of an aluminum alloy containing 0.3–2% of Mg, 0.3–1.5% of Si, 0.02–0.8% of Cu, and one or more of 0.05–0.3% of Mn, 0.02–0.5% of Cr, and 0.02–0.2% of Zr as required, a conventional brazing material of an Al—Si alloy clad on one side of the core material, and a sacrificial anode material of an aluminum alloy containing 0.2–3% of Zn, 0.005–0.05% of In, and 0.05–0.2% of Sn clad on the other side of the core material (Japanese Patent Application Laid-open No. 132284/1996).

These aluminum alloy clad materials exhibit an excellent sacrificial anode effect as a tube material for a radiator or heater, if the working fluid is neutral or weakly acidic and includes a Cl ion and has a relatively low temperature. However, if the working fluid is weakly alkaline and flows inside a heat exchanger at a high velocity, these materials exhibit insufficient corrosion resistance, thereby causing erosion-corrosion due to the insufficient anti-corrosion effect.

SUMMARY OF THE INVENTION

The present inventors have conducted studies on the corrosion mechanism of an aluminum alloy clad material comprising a sacrificial anode material clad on a core material in a weak alkaline solution, and examined countermeasures for preventing corrosion. As a result, the inventors have found that a brown or black film which is formed on the surface of a sacrificial anode material layer under weak alkaline conditions is removed by the impact of a high-velocity working fluid. The area where such a film is removed is preferentially corroded, thereby resulting in through-holes.

On the basis of the above findings, the present invention has been achieved as a result of diversified experiments and examinations in order to find a combination of a sacrificial anode material and a core material exhibiting excellent corrosion resistance in which the surface of the sacrificial anode material is protected to prevent a brown or black film from being produced under conditions where a weak alkaline working fluid flows at a high velocity. An object of the present invention is to provide an aluminum alloy clad material for heat exchangers which exhibits excellent erosion-corrosion resistance, does not produce through-holes due to erosion-corrosion under conditions where a weak alkaline working fluid flows at a high velocity, and is suitably used for a tube for a radiator or heater and for a pipe connected to heat exchangers.

In order to achieve the above object, the aluminum alloy clad material for heat exchangers exhibiting excellent erosion-corrosion resistance according to the present invention comprises a sacrificial anode material clad on one side of a core material, wherein the core material comprising an Al—Mn alloy and the sacrificial anode material comprising an aluminum alloy containing 3.0–12.0% of Si as an essential alloy component. Features of the aluminum alloy clad material of the present invention which comprises an aluminum alloy clad sheet and an aluminum alloy clad pipe are listed below.

(1) The core material comprises an Al—Mn alloy and the sacrificial anode material comprises an aluminum alloy containing 3.0–12.0% of Si with the remaining portion consisting of Al and impurities.

(2) The core material comprises an Al—Mn alloy and the sacrificial anode material comprises an aluminum alloy containing 3.0–12.0% of Si and 1.0–10.0% of Zn with the remaining portion consisting of Al and impurities.

(3) The core material comprises an Al—Mn alloy and the sacrificial anode material comprises an aluminum alloy containing 3.0–12.0% of Si and 0.15–1.2% of Fe with the remaining portion consisting of Al and impurities.

(4) The core material comprises an Al—Mn alloy and the sacrificial anode material comprises an aluminum alloy containing 3.0–12.0% of Si, 1.0–10.0% of Zn, and 0.15–1.2% of Fe with the remaining portion consisting of Al and impurities.

Features of the aluminum alloy clad sheet of the present invention are listed below.

(5) An aluminum alloy clad sheet having a two-layered structure which comprises the aluminum alloy clad material according to the above (1)–(4).

(6) In the above (5), the sacrificial anode material further comprises one or more of 0.001–0.05% of In, 0.001–0.05% of Sn, and 3.0% or less of Mg (but more than 0%, hereinafter the same).

(7) In the above (5) and (6), the sacrificial anode material further comprises one or more of 0.05% or less of Cu, 0.2% or less of Cr, 0.3% or less of Ti, 0.3% or less of Zr, and 0.1% or less of B.

(8) In the above (5)–(7), the Al—Mn alloy for the core material comprises more than 0.3% but 2.0% or less of Mn and either 0.1–1.0% of Cu or 0.1–1.1% of Si, or both, with the remaining portion consisting of Al and impurities.

(9) In the above (8), the Al—Mn alloy for the core material further comprises 0.5% or less of Mg.

(10) In the above (8) and (9), the Al—Mn alloy for the core material further comprises one or more of 0.35% or less of Ti, 0.5% or less of Cr, 0.3% or less of Zr, and 0.1% or less of B.

(11) In the above (5)–(10), a brazing material of an Al—Si alloy is clad on the side of the core material.

(12) In the above (11), the Al—Si alloy for the brazing material comprises 6.0–13.0% of Si with the remaining portion consisting of Al and impurities.

(13) In the above (12), the Al—Si alloy for the brazing material further comprises one or more of 2.0% or less of Mg, 0.2% or less of Bi, 0.1% or less of Be, 1.0% or less of Ca, and 1.0% or less of Li.

(14) In the above (5)–(13), $2\times10^3$–$8\times10^3$ Si particles having a particle diameter (circle equivalent diameter) of 0.5–5 µm exist per 1 mm$^2$ in the sacrificial anode material matrix.

The aluminum alloy clad pipe of the aluminum alloy clad material according to the present invention is manufactured by extrusion molding and has a two-layered structure comprising the aluminum alloy clad material, wherein an outer layer constituting the outer surface of the clad pipe is formed by the core material and an inner layer constituting the inner surface of the clad pipe is formed by the sacrificial anode material.

Features of the aluminum alloy clad pipe of the present invention are listed below.

(15) An aluminum alloy clad pipe comprising the aluminum alloy clad material according to the above (1)–(4).

(16) In the above (15), the aluminum alloy for the inner layer further comprises one or more of 0.001–0.05% of In and 0.001–0.05% of Sn.

(17) In the above (15) and (16), the aluminum alloy for the inner layer further comprises one or more of 0.05% or less of Cu (but more than 0%, hereinafter the same), 0.2% or less of Cr, 0.3% or less of Ti, 0.3% or less of Zr, and 0.1% or less of B.

(18) In the above (15)–(17), the Al—Mn alloy for the outer layer comprises more than 0.3% but 2.0% or less of Mn and 0.05–0.5% of Cu with the remaining portion consisting of Al and impurities.

(19) In the above (18), the Al—Mn alloy for the outer layer further comprises one or more of 0.35% or less of Ti, 0.5% or less of Cr, 0.3% or less of Zr, and 0.1% or less of B.

(20) In the above (15)–(19), an outermost layer of pure aluminum is clad on the side of the outer layer of the aluminum alloy clad pipe to provide an aluminum alloy clad pipe with a three-layered structure.

(21) In the above (15)–(19), an outermost layer of an aluminum alloy comprising 0.3–3.0% of Zn with the remaining portion consisting of Al and impurities is clad on the outer layer of the aluminum alloy clad pipe to provide an aluminum alloy clad pipe with a three-layered structure.

(22) In the above (20), the aluminum for the outermost layer further comprises either 0.001–0.05% of In or 0.001–0.05% of Sn, or both.

(23) In the above (21), the aluminum alloy for the outermost layer further comprises either 0.001–0.05% of In or 0.001–0.05% of Sn, or both.

(24) In the above (20) or (22), the aluminum for the outermost layer further comprises one or more of 0.05% or less of Cu, 0.2% or less of Cr, 0.3% or less of Ti, 0.3% or less of Zr, and 0.1% or less of B.

(25) In the above (21) or (23), the aluminum alloy for the outermost layer further comprises one or more of 0.05% or less of Cu, 0.2% or less of Cr, 0.3% or less of Ti, 0.3% or less of Zr, and 0.1% or less of B.

(26) In the above (15)–(25), $2\times10^3$–$8\times10^3$ Si particles having a particle diameter (circle equivalent diameter) of 0.5–5 µm exist per 1 mM$^2$ in the aluminum alloy matrix for the inner layer.

Other objects, features and advantages of the invention will hereinafter become more readily apparent from the following description.

DETAILED DESCRIPTION OF THE INVENTION AND PREFERRED EMBODIMENT

Figure 1:
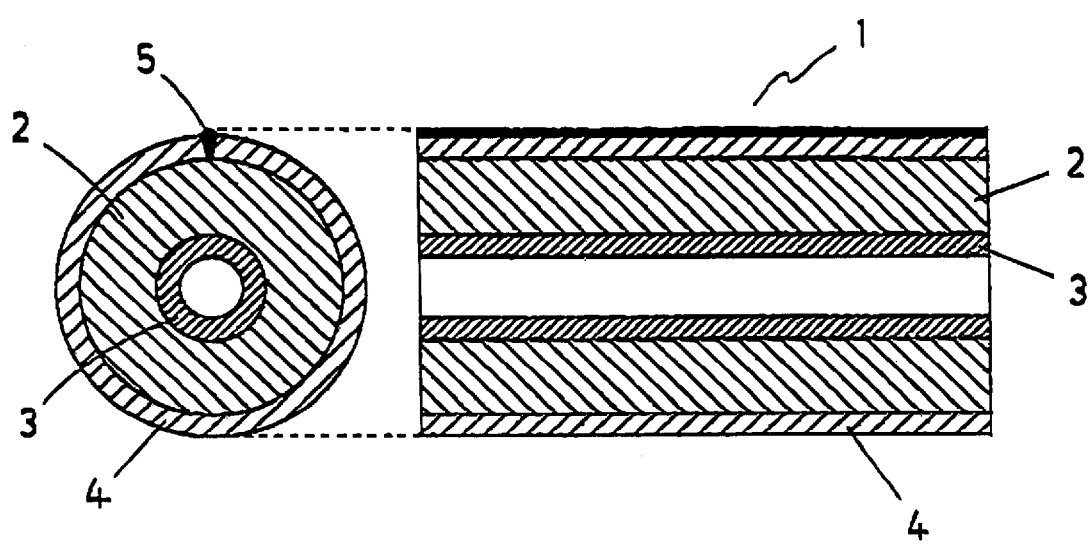
FIG. 1 is a cross section of billets for extrusion molding for manufacturing an aluminum alloy clad pipe of the present invention.

The purpose, limited ranges, and reasons for limitations of alloy components added to the aluminum alloy clad material of the present invention will be described below.

A. Sacrificial Anode Material (Inner Layer)

Si itself is stable under weak alkaline conditions and is dissolved in an Al matrix as a solid solution to reduce solubility of the Al matrix under weak alkaline conditions. The dissolved Si is deposited on the surface of a sacrificial anode material layer as a hydrated oxide film to protect the sacrificial anode material layer. The content of Si is preferably in the range from 3.0–12.0%. If the content is less than 3.0%, the effect is insufficient. If the content exceeds 12.0%, in the case of the clad sheet, rolling workability decreases and the sacrificial anode layer tends to melt when heated for brazing due to the decreased melting point, whereby it is difficult to secure a sacrificial anode layer with a sufficient thickness. In the case of the clad pipe, extrusion workability decreases. The content range of Si in the clad sheet to secure a sacrificial anode layer with a sufficient thickness by preventing the sacrificial anode layer from melting when heated for brazing is preferably 3.0–6.0%, and still more preferably 3.0–5.0%. The content of Si in the clad pipe is preferably 6.0–8.5%.

Zn brings the potential of the sacrificial anode material to a lower side and maintains a sacrificial anode effect to a core material to prevent pitting or crevice corrosion of the core material. Since Si brings the potential to a higher side, a large amount of Zn must be added. The content of Zn is preferably 1.0–10.0%. If the content is less than 1%, the effect is insufficient. If the content exceeds 10%, self-corrosion resistance decreases. The content of Zn in the clad sheet is still more preferably 2.0–6.0%, and the content of Zn in the clad pipe is still more preferably 1.5–5.0%.

Fe forms dispersed Al—Fe or Al—Fe—Si compounds. Because corrosion originates with these compounds and pitting is dispersed, corrosion resistance is improved. The content of Fe is preferably 0.15–1.2%. If the content is less than 0.15%, the effect is insufficient. If the content exceeds 1.2%, self-corrosion resistance of the sacrificial anode material decreases.

In and Sn brings the potential of the sacrificial anode material to a lower side on the addition of trace amounts to secure the sacrificial anode effect in the core material. As a result, In and Sn prevent pitting or crevice corrosion of the core material. The content for each of In and Sn is preferably 0.001–0.05%. If the content is less than 0.001%, the effect is insufficient. If the content exceeds 0.05%, self-corrosion resistance, rolling workability, and extrusion workability decrease. The content for each of In and Sn is still more preferably 0.01–0.02%.

Mg forms $Mg_2Si$ in the clad sheet in the presence of Si and is finely dispersed in the sacrificial anode material. Mg prevents the deposition of aluminum hydroxide which is a component of a brown or black film formed on the surface of the material under weak alkaline conditions to hinder formation of the brown or black film, and pitting is dispersed to prevent occurrence of through-pits. The content of Mg is preferably 3.0% or less. If the content exceeds 3.0%, self-corrosion resistance of the sacrificial anode material decreases. The content of Mg is still more preferably less than 1.5%.

Cu brings the potential of the sacrificial anode material to a higher side and hinders a decrease in self-corrosion resistance of the sacrificial anode material due to the addition of Zn. Because Cu brings the potential of the sacrificial anode material to a higher side, the content must be 0.05% or less. If the content exceeds 0.05%, the potential difference between the sacrificial anode material and the core material cannot be sufficiently secured, whereby the sacrificial anode effect on the core material decreases.

Ti deposits separately in a high-concentration area and in a low-concentration area. These areas are distributed alternately in layers in the direction of the plate thickness when rolled. The low Ti concentration area is preferentially corroded rather than the high Ti concentration area, thereby forming corroded layers, which prevents corrosion from proceeding in the direction of the plate thickness and improves pitting resistance. The content of Ti is preferably 0.3% or less. If the content exceeds 0.3%, coarse compounds may be produced when cast, thereby hindering both rolling workability and extrusion workability.

In the clad sheet, Cr, Zr, and B prevent the brazing material from permeating the sacrificial anode material during heating for brazing. In the clad pipe, Cr, Zr, and B reduce intergranular corrosion by coarsening grains to improve self-corrosion resistance of the sacrificial anode layer. The content of Cr, Zr, and B is preferably 0.2% or less, 0.3% or less, and 0.1% or less, respectively. If the content exceeds these limits, coarse compounds are formed at the time of casting, whereby a sound material cannot be manufactured.

Erosion resistance is improved by dispersing fine Si particles in the sacrificial anode material. It is preferable that $2 \times 10^3 - 8 \times 10^3$ Si particles having a particle diameter (circle equivalent diameter) of 0.5–5 $\mu$m exist per 1 $mm^2$ in the matrix. If the distribution is less than the lower limit, the effect is insufficient. If the distribution is more than the upper limit, self-corrosion resistance of the sacrificial anode material layer decreases.

B. Core Material (Outer Layer)

Mn improves the strength of the core material and brings the potential of the core material to a higher side to enlarge the potential difference from the sacrificial anode layer, thereby improving corrosion resistance. The core material preferably contains more than 0.3% but 2.0% or less of Mn. If the content is 0.3% or less, the effect is insufficient. If the content exceeds 2.0%, because macromolecules are produced at the time of casting, rolling workability and extrusion workability are hindered. As a result, neither a sound sheet nor a fine pipe can be produced. The content of Mn is still more preferably 0.8–1.5%.

Cu improves the strength of the core material and brings the potential of the core material to a higher side to enlarge the potential difference from both the sacrificial anode layer and the brazing material, thereby improving the anti-corrosion effect. In the clad sheet, Cu in the core material diffuses into the sacrificial anode material and the brazing material at the time of heating for brazing to form a gentle concentration gradient. As a result, the potential of the core material is brought to a higher side and the potentials of the surface of the sacrificial anode material and the surface of the brazing material are brought to a lower side. Therefore, because a gentle potential gradient is formed in the sacrificial anode material and the brazing material, corrosion spreads over the whole surface in the lateral direction, whereby the anti-corrosion effect against corrosion from the surface is provided. The content of Cu in the clad sheet is preferably 0.1–1.0%. If the content is less than 0.1%, the effect is insufficient. If the content exceeds 1.0%, corrosion resistance of the core material decreases and local fusion tends to occur at the interface with a braze at the time of brazing due to the decreased melting point. The content of Cu is still more preferably 0.4–0.6%. The content of Cu in the clad pipe is preferably 0.05–0.5%, and still more preferably 0.1–0.3%.

Si improves the strength of the core material in the clad sheet. In particular, Si forms $Mg_2Si$ in the presence of Mg which diffuses from the sacrificial anode material at the time of brazing and exhibits an age hardening effect after brazing, thereby further improving the strength of the core material. The content of Si is preferably 0.1–1.1%. If the content is less than 0.1%, the effect is insufficient. If the content exceeds 1.1%, corrosion resistance decreases and local fusion tends to occur at the interface with a braze at the time of brazing due to the decreased melting point. The content of Si is still more preferably 0.3–0.7%.

Mg improves the strength of the core material in the clad sheet. The content of Mg is preferably 0.5% or less in view of brazability. If the content exceeds 0.5%, Mg reacts with a flux during brazing in an inert gas atmosphere using a fluoride-type flux to hinder brazability. Moreover, a fluoride of Mg is produced to impair the appearance of the brazed part. In the case of vacuum brazing, a fused braze tends to erode the core material. The content of Mg is still more preferably 0.15% or less.

Ti deposits separately in a high-concentration area and in a low-concentration area. These areas are distributed alternately in layers in the direction of the plate thickness when rolled. The low Ti concentration area is preferentially corroded rather than the high Ti concentration area to form corroded layers. As a result, corrosion in the direction of the plate thickness is hindered, thereby improving pitting resistance. The content of Ti in the clad sheet is preferably 0.35% or less. If the content exceeds 0.35%, coarse compounds tend to be produced at the time of casting, thereby hindering rolling workability. The content of Ti in the clad pipe is preferably 0.3% or less. If the content exceeds 0.3%, coarse compounds tend to be produced at the time of casting, thereby hindering extrusion workability.

In the clad sheet, Cr, Zr, and B prevent the brazing material from permeating the core material during heating for brazing. In the clad pipe, Cr, Zr, and B reduce intergranular corrosion by coarsening grains, thereby improving self-corrosion resistance of the core material layer. The content of Cr, Zr, and B is preferably 0.5% or less, 0.3% or less, and 0.1% or less, respectively. If the content exceeds these upper limits, coarse compounds are formed at the time of casting, whereby a sound sheet or fine extruded material cannot be produced. If even 0.8% or less of Fe and 0.3% of less of Zn are included in the core material as impurities, characteristics of the core material are not affected.

C. Brazing Material of Clad Sheet

As the brazing material, an Al—Si alloy commonly used for brazing aluminum is used. Si decreases the melting point of the aluminum alloy brazing material to increase fluidity of the melted braze. The content of Si is preferably 6.0–13.0%. In the case of vacuum brazing, a conventional Al—Si—Mg alloy further containing 2.0% or less of Mg is used.

0.2% or less of Bi, 0.1% or less of Be, 1.0% or less of Ca, and 1.0% or less of Li may be added to the Al—Si alloy brazing material or Al—Si—Mg alloy brazing material in order to improve brazing characteristics. If even 0.1% or less of Cu, 0.3% or less of Cr, Zr, or Mn, and 0.5% of less of Fe are included in the brazing material as impurities, the effect of the present invention is not adversely affected.

D. Outermost Layer of Clad Pipe (Sacrificial Anode Material Layer)

Zn brings the potential of the sacrificial anode material for the outermost layer to a lower side and maintains the sacrificial anode effect in a core material to prevent pitting or crevice corrosion in the core material. The content of Zn is preferably 0.3–3%. If the content is less than 0.3%, the effect is insufficient. If the content exceeds 3%, self-corrosion resistance decreases. The content of Zn is still more preferably 0.5–1.5%.

In and Sn bring the potential of the outermost sacrificial anode material layer to a lower side with trace amounts of addition to secure the sacrificial anode effect on the core material layer. As a result, In and Sn prevent pitting or crevice corrosion of the core material layer. The content of each of In and Sn is preferably 0.001–0.05%. If the content is less than 0.001%, the effect is insufficient. If the content exceeds 0.05%, self-corrosion resistance and extrusion workability decrease. The content of In and Sn is still more preferably 0.01–0.02%.

Cu brings the potential of the outermost sacrificial anode material layer to a higher side and hinders decrease in self-corrosion resistance due to the addition of Zn to the sacrificial anode material layer. Because Cu brings the potential of the sacrificial anode material layer to a higher side, the content of Cu must be 0.05% or less. If the content of Cu exceeds 0.05%, the potential difference between the sacrificial anode material layer and the core material layer cannot be sufficiently secured, whereby the sacrificial anode effect on the core material layer decreases.

Ti deposits separately in a high-concentration area and in a low-concentration area. These areas are distributed alternately in layers. Because the low Ti concentration area is preferentially corroded rather than the high Ti concentration area to form corroded layers. As a result, corrosion in the direction of the thickness is prevented, thereby improving pitting resistance. The content of Ti is preferably 0.3% or less. If the content exceeds 0.3%, coarse compounds tend to be produced at the time of casting, thereby hindering extrusion workability.

Cr, Zr, and B reduce intergranular corrosion by increasing the crystal size to improve self-corrosion resistance of the outermost sacrificial anode layer. The content of Cr, Zr, and B is preferably 0.2% or less, 0.3% or less, and 0.1% or less, respectively. If the content exceeds these upper limits, coarse compounds are formed at the time of casting, whereby a sound material cannot be manufactured.

In the present invention, if even the pure aluminum constituting the outermost layer comprises Fe, Si, Cu, Mn, Zn, or the like in an amount equal to that of common pure aluminum, the characteristics of the present invention is not adversely affected.

The aluminum alloy clad sheet for heat exchangers of the present invention is manufactured by casting the aluminum alloys constituting the core material and the sacrificial anode material, or the core material, sacrificial anode material, and the brazing material by semicontinuous casting, for example. After homogenization as required, the materials are rolled to a predetermined thickness by hot rolling. The materials are then assembled into a clad material by hot rolling according to a conventional method. The clad material is rolled by cold rolling to a predetermined thickness and annealed, as required.

The aluminum alloy clad sheet of the present invention is used as a material for heat exchangers such as a radiator or heater. In the case of the two-layered clad sheet comprising the core material and the sacrificial anode material, the clad sheet is formed by curving the materials with the core material being the outer layer. In the case of the three-layered clad sheet comprising the brazing material, core material, and sacrificial anode material, the clad sheet is formed by curving the materials with the brazing material being the outer layer. The clad sheet is joined by welding or brazing into a tube. An aluminum alloy fin material is joined to the clad material by brazing by way of a brazing material clad on the fin material or the brazing material of the clad sheet to assemble a heat exchanger.

The aluminum alloy clad pipe of the present invention is manufactured by casting the aluminum alloys constituting the inner layer and the outer layer into billets by semicontinuous casting, for example. After homogenization as required, the aluminum alloy billet for the inner layer and the aluminum alloy billet for the outer layer (core material layer) are cut in a circle or extruded in a circle so as to form sleeves with a predetermined shape.

An aluminum alloy sleeve 3 for the inner layer is then inserted into an aluminum alloy sleeve 2 for the core material layer as shown in FIG. 1. An aluminum or aluminum alloy ingot for the outermost layer is rolled by hot rolling into a sheet 4 with a predetermined thickness. The sheet 4 is wound around the aluminum alloy sleeve 2 for the core material layer and a joint of the plate is joined by welding using, for example, MIG welding to form a billet 1 for extrusion. The billet 1 is extruded and reduced by drawing, as required. In FIG. 1, 5 indicates a welded part.

The billet for extrusion may be manufactured by inserting the aluminum alloy sleeve 3 for the inner layer into the aluminum alloy sleeve 2 for the core material layer, and then inserting these sleeves into the aluminum alloy sleeve for the outermost layer. When the aluminum alloy clad pipe of the present invention is used as a constituent material for heat exchangers such as a radiator or heater, the clad pipe is mechanically assembled into a fin by a pipe expansion method, engaging method, or the like.

EXAMPLES

The aluminum alloy clad sheet of the present invention will be described below by the use of examples and comparative examples. The Example and Comparative Example illustrate a three-layered clad sheet consisting of the brazing material, core material, and sacrificial anode material. In the present invention, heat exchangers can be manufactured by brazing a two-layered clad sheet consisting of the core material and the sacrificial anode material by way of a brazing material clad on a fin material. The present invention is applied to either the two-layered clad sheet or the three-layered clad sheet according to the embodiment.

Example 1

An aluminum alloy for the core material with a composition as shown in Table 1, an aluminum alloy for the sacrificial anode material with a composition as shown in Tables 2–4, and an aluminum alloy for the brazing material with a composition shown in Table 5 were cast by continuous casting. The aluminum alloys for the core material and for the sacrificial anode material were homogenized. The aluminum alloys for the sacrificial anode material and the brazing material were rolled to a predetermined thickness by hot rolling. The aluminum alloys were assembled with the aluminum alloy ingot for the core material and rolled by both hot rolling and cold rolling. After annealing, cold rolling was performed to prepare an aluminum alloy clad plate (temper: H14) with a thickness of 0.25 mm. The thickness of the sacrificial anode material clad on both sides of the core material and the brazing material was 0.025–0.05 mm and 0.025 mm, respectively.

The resulting aluminum alloy clad sheet (test material) was heated at a brazing temperature of 600° C. (material temperature) in a nitrogen gas atmosphere using a fluoride-type flux. Corrosion resistance of the side of the sacrificial anode material was evaluated according to the following methods. Brazability was also evaluated. The results are shown in Tables 6–11.

(1) Corrosion Resistance Evaluation 1

In an aqueous solution including 195 ppm of $Cl^-$, 60 ppm of $SO_4^{2-}$, 21 ppm of $Cu^+$, and 30 ppm of $Fe^{3+}$, a heat cycle of heating at 88° C. for 8 hours and cooling to hold at 25° C. for 16 hours was repeated 90 times to evaluate corrosion resistance on the side of the sacrificial anode material by the occurrence of perforating corrosion (did not occur: ○, occurred: X).

(2) Corrosion Resistance Evaluation 2

A commercially available coolant (pH was adjusted to 10 with NaOH) was circulated inside the piping at a flow rate of 10 m/second. The clad plate was installed in the piping so as to be parallel to the flow. A heat cycle of heating at 88° C. for 8 hours and cooling to hold at 25° C. for 16 hours was repeated 20 times to evaluate corrosion resistance on the side of the sacrificial anode material by the occurrence of perforating corrosion (did not occur: ○, occurred: X)

(3) Evaluation of Brazability

Brazability was evaluated by the occurrence of melting of the core material or the sacrificial anode material after heating at a brazing temperature of 600° C.

TABLE 1

| Core material | Composition (wt %) | | | | | |
|---|---|---|---|---|---|---|
| | Mn | Cu | Si | Fe | Mg | Other |
| S1 | 1.20 | — | 0.30 | 0.30 | — | |
| S2 | 1.20 | 0.15 | 0.30 | 0.30 | — | |
| S3 | 1.20 | 0.50 | 0.50 | 0.20 | — | |
| S4 | 0.85 | 0.50 | 0.50 | 0.20 | — | |
| S5 | 1.45 | 0.50 | 0.50 | 0.20 | — | |
| S6 | 1.20 | 0.42 | 0.50 | 0.20 | — | |
| S7 | 1.20 | 0.58 | 0.50 | 0.20 | — | |
| S8 | 1.20 | 0.50 | 0.35 | 0.20 | — | |
| S9 | 1.20 | 0.50 | 0.65 | 0.20 | — | |
| S10 | 0.40 | 0.50 | 0.50 | 0.20 | — | |
| S11 | 1.80 | 0.50 | 0.50 | 0.20 | — | |
| S12 | 1.20 | 0.15 | 0.50 | 0.20 | — | |
| S13 | 1.20 | 0.90 | 0.50 | 0.20 | — | |
| S14 | 1.20 | 0.50 | 0.15 | 0.20 | — | |
| 515 | 1.20 | 0.50 | 1.00 | 0.20 | — | |
| S16 | 1.20 | 0.50 | 0.50 | 0.20 | 0.12 | |
| S17 | 1.20 | 0.50 | 0.50 | 0.20 | — | Ti 0.15 |
| S18 | 1.20 | 0.50 | 0.50 | 0.20 | — | Cr 0.10 |
| S19 | 1.20 | 0.50 | 0.50 | 0.20 | — | Zr 0.15 |
| S20 | 1.20 | 0.50 | 0.50 | 0.20 | — | B 0.05 |

TABLE 2

| Sacrificial anode material | Composition (wt %) | | | | |
|---|---|---|---|---|---|
| | Si | Fe | In | Sn | Mg |
| U1 | 4.00 | 0.30 | 0.20 | — | — |
| U2 | 4.00 | 0.30 | — | 0.20 | — |
| U3 | 4.00 | 0.30 | 0.20 | 0.20 | — |
| U4 | 3.20 | 0.30 | — | — | — |
| U5 | 5.90 | 0.30 | — | — | — |
| U6 | 4.80 | 0.30 | — | — | — |
| U7 | 3.20 | 0.30 | 0.20 | — | — |
| U8 | 5.90 | 0.30 | 0.20 | — | — |
| U9 | 4.80 | 0.30 | 0.20 | — | — |
| U10 | 3.20 | 0.30 | — | 0.20 | — |
| U11 | 5.90 | 0.30 | — | 0.20 | — |
| U12 | 4.80 | 0.30 | — | 0.20 | — |
| U13 | 3.00 | 0.30 | 0.20 | — | — |
| U14 | 11.00 | 0.30 | 0.20 | — | — |
| U15 | 4.00 | 0.30 | 0.001 | — | — |
| U16 | 4.00 | 0.30 | 0.05 | — | — |

TABLE 2-continued

| Sacrificial anode material | Composition (wt %) | | | | |
|---|---|---|---|---|---|
| | Si | Fe | In | Sn | Mg |
| U17 | 4.00 | 0.30 | — | 0.001 | — |
| U18 | 4.00 | 0.30 | — | 0.05 | — |

TABLE 3

| Sacrificial anode material | Composition (wt %) | | | | | |
|---|---|---|---|---|---|---|
| | Si | Fe | In | Sn | Mg | Other |
| U19 | 4.00 | 0.30 | 0.02 | — | 1.00 | |
| U20 | 4.00 | 0.30 | 0.02 | — | — | Cu 0.03 |
| U21 | 4.00 | 0.30 | 0.02 | — | — | Cr 0.10 |
| U22 | 4.00 | 0.30 | 0.02 | — | — | Ti 0.10 |
| U23 | 4.00 | 0.30 | 0.02 | — | — | Zr 0.10 |
| U24 | 4.00 | 0.30 | 0.02 | — | — | B 0.05 |
| U25 | 4.00 | 1.00 | 0.02 | — | — | |
| U26 | 4.00 | 0.15 | 0.02 | — | — | |
| U27 | 4.00 | 1.20 | 0.02 | — | — | |

TABLE 4

| Sacrificial anode material | Composition (wt %) | | | | | | |
|---|---|---|---|---|---|---|---|
| | Si | Fe | Zn | In | Sn | Mg | Other |
| U28 | 4.00 | 0.30 | 3.00 | — | — | — | |
| U29 | 3.20 | 0.30 | 3.00 | — | — | — | |
| U30 | 5.90 | 0.30 | 3.00 | — | — | — | |
| U31 | 4.80 | 0.30 | 3.00 | — | — | — | |
| U32 | 4.00 | 0.30 | 2.20 | — | — | — | |

TABLE 4-continued

| Sacrificial anode material | Composition (wt %) | | | | | | |
|---|---|---|---|---|---|---|---|
| | Si | Fe | Zn | In | Sn | Mg | Other |
| U33 | 4.00 | 0.30 | 5.80 | — | — | — | |
| U34 | 3.00 | 0.30 | 3.00 | — | — | — | |
| U35 | 11.00 | 0.30 | 3.00 | — | — | — | |
| U36 | 4.00 | 0.30 | 1.20 | — | — | — | |
| U37 | 4.00 | 0.30 | 9.50 | — | — | — | |
| U38 | 4.00 | 0.30 | 3.00 | 0.02 | — | — | |
| U39 | 4.00 | 0.30 | 3.00 | — | 0.02 | — | |
| U40 | 4.00 | 0.30 | 3.00 | — | — | 1.00 | |
| U41 | 4.00 | 0.30 | 3.00 | — | — | — | Cu 0.03 |
| U42 | 4.00 | 0.30 | 3.00 | — | — | — | Cr 0.10 |
| U43 | 4.00 | 0.30 | 3.00 | — | — | — | Ti 0.10 |
| U44 | 4.00 | 0.30 | 3.00 | — | — | — | Zr 0.10 |
| U45 | 4.00 | 0.30 | 3.00 | — | — | — | B 0.05 |
| U46 | 4.00 | 1.00 | 3.00 | — | — | — | |
| U47 | 4.00 | 0.15 | 3.00 | — | — | — | |
| U48 | 4.00 | 1.20 | 3.00 | — | — | — | |

TABLE 5

| Brazing material | Composition (wt %) | | |
|---|---|---|---|
| | Si | Fe | Other |
| R1 | 10.00 | 0.30 | |
| R2 | 7.50 | 0.30 | |
| R3 | 6.00 | 0.30 | |
| R4 | 13.00 | 0.30 | |
| R5 | 10.00 | 0.30 | Mg 1.5 |
| R6 | 10.00 | 0.30 | Bi 0.1 |
| R7 | 10.00 | 0.30 | Be 0.1 |
| R8 | 10.00 | 0.30 | Li 0.2 Ca 0.2 |

TABLE 6

| Test material | Core material | Combination Sacrificial anode material | | | Brazing material | Number of Si particles in sacrificial anode material per 1 mm$^2$ | Corrosion resistance evaluation 1* | Corrosion resistance evaluation 2* |
|---|---|---|---|---|---|---|---|---|
| | | Type | Thickness (mm) | | | | | |
| 1 | S1 | U1 | 0.040 | | R1 | $4 \times 10^3$ | ○ | ○ |
| 2 | S2 | U1 | 0.040 | | R1 | $4 \times 10^3$ | ○ | ○ |
| 3 | S3 | U1 | 0.025 | | R1 | $4 \times 10^3$ | ○ | ○ |
| 4 | S3 | U1 | 0.040 | | R1 | $4 \times 10^3$ | ○ | ○ |
| 5 | S3 | U1 | 0.050 | | R1 | $4 \times 10^3$ | ○ | ○ |
| 6 | S4 | U1 | 0.040 | | R1 | $4 \times 10^3$ | ○ | ○ |
| 7 | S5 | U1 | 0.040 | | R1 | $4 \times 10^3$ | ○ | ○ |
| 8 | S6 | U1 | 0.040 | | R1 | $4 \times 10^3$ | ○ | ○ |
| 9 | S7 | U1 | 0.040 | | R1 | $4 \times 10^3$ | ○ | ○ |
| 10 | S8 | U1 | 0.040 | | R1 | $4 \times 10^3$ | ○ | ○ |
| 11 | S9 | U1 | 0.040 | | R1 | $4 \times 10^3$ | ○ | ○ |
| 12 | S10 | U1 | 0.040 | | R1 | $4 \times 10^3$ | ○ | ○ |
| 13 | S11 | U1 | 0.040 | | R1 | $4 \times 10^3$ | ○ | ○ |
| 14 | S12 | U1 | 0.040 | | R1 | $4 \times 10^3$ | ○ | ○ |
| 15 | S13 | U1 | 0.040 | | R1 | $4 \times 10^3$ | ○ | ○ |
| 16 | S14 | U1 | 0.040 | | R1 | $4 \times 10^3$ | ○ | ○ |
| 17 | S15 | U1 | 0.040 | | R1 | $4 \times 10^3$ | ○ | ○ |
| 18 | S16 | U1 | 0.040 | | R1 | $4 \times 10^3$ | ○ | ○ |
| 19 | S17 | U1 | 0.040 | | R1 | $4 \times 10^3$ | ○ | ○ |

*Perforating corrosion: did not occur; ○, occurred; x

TABLE 7

| Test material | Core material | Sacrificial anode material Type | Thickness (mm) | Brazing material | Number of Si particles in sacrificial anode material per 1 mm² | Corrosion resistance evaluation 1* | Corrosion resistance evaluation 2* |
|---|---|---|---|---|---|---|---|
| 20 | S18 | U1 | 0.040 | R1 | $4 \times 10^3$ | ○ | ○ |
| 21 | S19 | U1 | 0.040 | R1 | $4 \times 10^3$ | ○ | ○ |
| 22 | S20 | U1 | 0.040 | R1 | $4 \times 10^3$ | ○ | ○ |
| 23 | S3 | U2 | 0.040 | R1 | $4 \times 10^3$ | ○ | ○ |
| 24 | S3 | U3 | 0.040 | R1 | $4 \times 10^3$ | ○ | ○ |
| 25 | S3 | U4 | 0.040 | R1 | $3 \times 10^3$ | ○ | ○ |
| 26 | S3 | U5 | 0.040 | R1 | $5 \times 10^3$ | ○ | ○ |
| 27 | S3 | U6 | 0.040 | R1 | $4.5 \times 10^3$ | ○ | ○ |
| 28 | S3 | U7 | 0.040 | R1 | $3 \times 10^3$ | ○ | ○ |
| 29 | S3 | U8 | 0.040 | R1 | $5 \times 10^3$ | ○ | ○ |
| 30 | S3 | U9 | 0.040 | R1 | $4.5 \times 10^3$ | ○ | ○ |
| 31 | S3 | U10 | 0.040 | R1 | $3 \times 10^3$ | ○ | ○ |
| 32 | S3 | U11 | 0.040 | R1 | $5 \times 10^3$ | ○ | ○ |
| 33 | S3 | U12 | 0.040 | R1 | $4.5 \times 10^3$ | ○ | ○ |
| 34 | S3 | U13 | 0.040 | R1 | $2 \times 10^3$ | ○ | ○ |
| 35 | S3 | U14 | 0.040 | R1 | $8 \times 10^3$ | ○ | ○ |
| 36 | S3 | U15 | 0.040 | R1 | $4 \times 10^3$ | ○ | ○ |
| 37 | S3 | U16 | 0.040 | R1 | $4 \times 10^3$ | ○ | ○ |

*Perforating corrosion: did not occur; ○, occurred; x

TABLE 8

| Test material | Core material | Sacrificial anode material Type | Thickness (mm) | Brazing material | Number of Si particles in sacrificial anode material per 1 mm² | Corrosion resistance evaluation 1* | Corrosion resistance evaluation 2* |
|---|---|---|---|---|---|---|---|
| 38 | S3 | U17 | 0.040 | R1 | $4 \times 10^3$ | ○ | ○ |
| 39 | S3 | U18 | 0.040 | R1 | $4 \times 10^3$ | ○ | ○ |
| 40 | S3 | U19 | 0.040 | R1 | $4 \times 10^3$ | ○ | ○ |
| 41 | S3 | U20 | 0.040 | R1 | $4 \times 10^3$ | ○ | ○ |
| 42 | S3 | U21 | 0.040 | R1 | $4 \times 10^3$ | ○ | ○ |
| 43 | S3 | U22 | 0.040 | R1 | $4 \times 10^3$ | ○ | ○ |
| 44 | S3 | U23 | 0.040 | R1 | $4 \times 10^3$ | ○ | ○ |
| 45 | S3 | U24 | 0.040 | R1 | $4 \times 10^3$ | ○ | ○ |
| 46 | S3 | U25 | 0.040 | R1 | $4 \times 10^3$ | ○ | ○ |
| 47 | S3 | U26 | 0.040 | R1 | $4 \times 10^3$ | ○ | ○ |
| 48 | S3 | U27 | 0.040 | R1 | $4 \times 10^3$ | ○ | ○ |
| 49 | S2 | U3 | 0.040 | R1 | $4 \times 10^3$ | ○ | ○ |
| 50 | S2 | U3 | 0.040 | R2 | $4 \times 10^3$ | ○ | ○ |
| 51 | S2 | U3 | 0.040 | R3 | $4 \times 10^3$ | ○ | ○ |
| 52 | S2 | U3 | 0.040 | R4 | $4 \times 10^3$ | ○ | ○ |
| 53 | S2 | U3 | 0.040 | R5 | $4 \times 10^3$ | ○ | ○ |
| 54 | S2 | U3 | 0.040 | R6 | $4 \times 10^3$ | ○ | ○ |
| 55 | S2 | U3 | 0.040 | R7 | $4 \times 10^3$ | ○ | ○ |
| 56 | S2 | U3 | 0.040 | R8 | $4 \times 10^3$ | ○ | ○ |

*Perforating corrosion: did not occur; ○, occurred; x

TABLE 9

| Test material | Core material | Sacrificial anode material Type | Thickness (mm) | Brazing material | Number of Si particles in sacrificial anode material per 1 mm$^2$ | Corrosion resistance evaluation 1* | Corrosion resistance evaluation 2* |
|---|---|---|---|---|---|---|---|
| 57 | S1 | U28 | 0.040 | R1 | $4 \times 10^3$ | o | o |
| 58 | S2 | U28 | 0.040 | R1 | $4 \times 10^3$ | o | o |
| 59 | S3 | U28 | 0.040 | R1 | $4 \times 10^3$ | o | o |
| 61 | S3 | U28 | 0.025 | R1 | $4 \times 10^3$ | o | o |
| 62 | S3 | U28 | 0.040 | R1 | $4 \times 10^3$ | o | o |
| 62 | S4 | U28 | 0.040 | R1 | $4 \times 10^3$ | o | o |
| 63 | S5 | U28 | 0.040 | R1 | $4 \times 10^3$ | o | o |
| 64 | S6 | U28 | 0.040 | R1 | $4 \times 10^3$ | o | o |
| 65 | S7 | U28 | 0.040 | R1 | $4 \times 10^3$ | o | o |
| 66 | S8 | U28 | 0.040 | R1 | $4 \times 10^3$ | o | o |
| 67 | S9 | U28 | 0.040 | R1 | $4 \times 10^3$ | o | o |
| 68 | S10 | U28 | 0.040 | R1 | $4 \times 10^3$ | o | o |
| 69 | S11 | U28 | 0.040 | R1 | $4 \times 10^3$ | o | o |
| 70 | S12 | U28 | 0.040 | R1 | $4 \times 10^3$ | o | o |
| 71 | S13 | U28 | 0.040 | R1 | $4 \times 10^3$ | o | o |
| 72 | S14 | U28 | 0.040 | R1 | $4 \times 10^3$ | o | o |
| 73 | S15 | U28 | 0.040 | R1 | $4 \times 10^3$ | o | o |
| 74 | S16 | U28 | 0.040 | R1 | $4 \times 10^3$ | o | o |
| 75 | S17 | U28 | 0.040 | R1 | $4 \times 10^3$ | o | o |

*Perforating corrosion: did not occur; o, occurred; x

TABLE 10

| Test material | Core material | Sacrificial anode material Type | Thickness (mm) | Brazing material | Number of Si particles in sacrificial anode material per 1 mm$^2$ | Corrosion resistance evaluation 1* | Corrosion resistance evaluation 2* |
|---|---|---|---|---|---|---|---|
| 76 | S18 | U28 | 0.040 | R1 | $4 \times 10^3$ | o | o |
| 77 | S19 | U28 | 0.040 | R1 | $4 \times 10^3$ | o | o |
| 78 | S20 | U28 | 0.040 | R1 | $4 \times 10^3$ | o | o |
| 79 | S3 | U29 | 0.040 | R1 | $3 \times 10^3$ | o | o |
| 80 | S3 | U30 | 0.040 | R1 | $5 \times 10^3$ | o | o |
| 81 | S3 | U31 | 0.040 | R1 | $4.5 \times 10^3$ | o | o |
| 82 | S3 | U32 | 0.040 | R1 | $4 \times 10^3$ | o | o |
| 83 | S3 | U33 | 0.040 | R1 | $4 \times 10^3$ | o | o |
| 84 | S3 | U34 | 0.040 | R1 | $3 \times 10^3$ | o | o |
| 85 | S3 | U35 | 0.040 | R1 | $8 \times 10^3$ | o | o |
| 86 | S3 | U36 | 0.040 | R1 | $4 \times 10^3$ | o | o |
| 87 | S3 | U37 | 0.040 | R1 | $4 \times 10^3$ | o | o |
| 88 | S3 | U38 | 0.040 | R1 | $4 \times 10^3$ | o | o |
| 89 | S3 | U39 | 0.040 | R1 | $4 \times 10^3$ | o | o |
| 90 | S3 | U40 | 0.040 | R1 | $4 \times 10^3$ | o | o |
| 91 | S3 | U41 | 0.040 | R1 | $4 \times 10^3$ | o | o |
| 92 | S3 | U42 | 0.040 | R1 | $4 \times 10^3$ | o | o |
| 93 | S3 | U43 | 0.040 | R1 | $4 \times 10^3$ | o | o |

*Perforating corrosion: did not occur; o, occurred; x

TABLE 11

| Test material | Core material | Sacrificial anode material Type | Thickness (mm) | Brazing material | Number of Si particles in sacrificial anode material per 1 mm$^2$ | Corrosion resistance evaluation 1* | Corrosion resistance evaluation 2* |
|---|---|---|---|---|---|---|---|
| 94 | S18 | U44 | 0.040 | R1 | $4 \times 10^3$ | o | o |
| 95 | S19 | U45 | 0.040 | R1 | $4 \times 10^3$ | o | o |

TABLE 11-continued

| Test material | Core material | Sacrificial anode material Type | Thickness (mm) | Brazing material | Number of Si particles in sacrificial anode material per 1 mm² | Corrosion resistance evaluation 1* | Corrosion resistance evaluation 2* |
|---|---|---|---|---|---|---|---|
| 96 | S20 | U46 | 0.040 | R1 | $4 \times 10^3$ | o | o |
| 97 | S3 | U47 | 0.040 | R1 | $4 \times 10^3$ | o | o |
| 98 | S3 | U48 | 0.040 | R1 | $4 \times 10^3$ | o | o |
| 99 | S3 | U1 | 0.040 | R2 | $4 \times 10^3$ | o | o |
| 100 | S3 | U1 | 0.040 | R3 | $4 \times 10^3$ | o | o |
| 101 | S3 | U1 | 0.040 | R4 | $4 \times 10^3$ | o | o |
| 102 | S3 | U1 | 0.040 | R5 | $4 \times 10^3$ | o | o |
| 103 | S3 | U1 | 0.040 | R6 | $4 \times 10^3$ | o | o |
| 104 | S3 | U1 | 0.040 | R7 | $4 \times 10^3$ | o | o |
| 105 | S3 | U1 | 0.040 | R8 | $4 \times 10^3$ | o | o |

*Perforating corrosion: did not occur; o, occurred; x

As shown in Tables 6–11, test materials Nos. 1–105 according to the present invention produced no through-holes in the corrosion resistance tests and exhibited excellent corrosion resistance and excellent erosion-corrosion resistance. These test materials exhibited excellent brazability without melting when heated for brazing and did not hinder a rolling process because of superior rolling workability.

Comparative Example 1

An aluminum alloy for the core material with a composition shown in Table 12, an aluminum alloy for the sacrificial anode material with a composition shown in Tables 13 and 14, and an aluminum alloy for the brazing material with a composition shown in Table 15 were cast by continuous casting. The aluminum alloys for the core material and for the sacrificial anode material were homogenized in the same manner as in Example 1. The aluminum alloys for the sacrificial anode material and for the brazing material were rolled to a predetermined thickness by hot rolling. The aluminum alloys were assembled with the aluminum alloy ingot for the core material and rolled by both hot rolling and cold rolling. After annealing, cold rolling was performed to provide an aluminum alloy clad plate (temper: H14) with a thickness of 0.25 mm. The thickness of the brazing material and the sacrificial anode material clad on both sides of the core material was 0.025 mm and 0.025–0.05 mm, respectively.

The resulting aluminum alloy clad sheet was heated at a brazing temperature of 600° C. (material temperature) in a nitrogen gas atmosphere using a fluoride-type flux in the same manner as in Example 1. Corrosion resistance of the side of the sacrificial anode material was evaluated according to the same methods as in Example 1. Brazability was evaluated in the same manner as in Example 1. The results are shown in Tables 16–18.

TABLE 12

| Core material | Composition (wt %) | | | | | |
|---|---|---|---|---|---|---|
| | Mn | Cu | Si | Fe | Mg | Other |
| S21 | 0.10 | 0.50 | 0.50 | 0.20 | — | |
| S22 | 2.20 | 0.50 | 0.50 | 0.20 | — | |
| S23 | 1.20 | 0.05 | 0.50 | 0.20 | — | |
| S24 | 1.20 | 1.20 | 0.50 | 0.20 | — | |
| S25 | 1.20 | 0.50 | 1.20 | 0.20 | — | |

TABLE 12-continued

| Core material | Composition (wt %) | | | | | |
|---|---|---|---|---|---|---|
| | Mn | Cu | Si | Fe | Mg | Other |
| S26 | 1.20 | 0.50 | 0.50 | 0.20 | 0.60 | |
| S27 | 1.20 | 0.50 | 0.50 | 0.20 | — | Ti 0.4 |
| S28 | 1.20 | 0.50 | 0.50 | 0.20 | — | Cr 0.6 |
| S29 | 1.20 | 0.50 | 0.50 | 0.20 | — | Zr 0.4 |
| S30 | 1.20 | 0.50 | 0.50 | 0.20 | — | B 0.2 |

TABLE 13

| Sacrificial anode material | Composition (wt %) | | | | | |
|---|---|---|---|---|---|---|
| | Si | Fe | In | Sn | Mg | Other |
| U49 | 2.00 | 0.30 | — | — | — | |
| U50 | 13.00 | 0.30 | — | — | — | |
| U51 | 4.00 | 0.30 | 0.10 | — | — | |
| U52 | 4.00 | 0.30 | — | 0.10 | — | |
| U53 | 4.00 | 0.30 | — | — | 5.00 | |
| U54 | 4.00 | 0.30 | — | — | — | Cu 0.1 |
| U55 | 4.00 | 0.30 | — | — | — | Cr 0.4 |
| U56 | 4.00 | 0.30 | — | — | — | Ti 0.4 |
| U57 | 4.00 | 0.30 | — | — | — | Zr 0.4 |
| U58 | 4.00 | 0.30 | — | — | — | B 0.2 |
| U59 | 4.00 | 0.05 | — | — | — | |
| U60 | 4.00 | 1.50 | — | — | — | |

TABLE 14

| Sacrificial anode material | Composition (wt %) | | | | | | |
|---|---|---|---|---|---|---|---|
| | Si | Fe | Zn | In | Sn | Mg | Other |
| U61 | 2.00 | 0.30 | 3.00 | — | — | — | |
| U62 | 13.00 | 0.30 | 3.00 | — | — | — | |
| U63 | 4.00 | 0.30 | 0.50 | — | — | — | |
| U64 | 4.00 | 0.30 | 12.00 | — | — | — | |
| U65 | 4.00 | 0.30 | 3.00 | 0.10 | — | — | |
| U66 | 4.00 | 0.30 | 3.00 | — | 0.10 | — | |
| U67 | 4.00 | 0.30 | 3.00 | — | — | 5.00 | |
| U68 | 4.00 | 0.30 | 3.00 | — | — | — | Cu 0.1 |
| U69 | 4.00 | 0.30 | 3.00 | — | — | — | Cr 0.4 |
| U70 | 4.00 | 0.30 | 3.00 | — | — | — | Ti 0.4 |
| U71 | 4.00 | 0.30 | 3.00 | — | — | — | Zr 0.4 |
| U72 | 4.00 | 0.30 | 3.00 | — | — | — | B 0.2 |

TABLE 14-continued

| Sacrificial anode material | Composition (wt %) | | | | | |
|---|---|---|---|---|---|---|
| | Si | Fe | Zn | In | Sn | Mg Other |
| U73 | 4.00 | 0.05 | 3.00 | — | — | — |
| U74 | 4.00 | 1.50 | 3.00 | — | — | — |

TABLE 15

| Brazing material | Composition (wt %) | | |
|---|---|---|---|
| | Si | Fe | Other |
| R9 | 5.00 | 0.30 | |
| R10 | 15.00 | 0.30 | |

TABLE 16

| | | Combination | | | Number of Si particles in sacrificial anode material per 1 mm$^2$ | Corrosion resistance evaluation 1* | Corrosion resistance evaluation 2* |
|---|---|---|---|---|---|---|---|
| | | Sacrificial anode material | | | | | |
| Test material | Core material | Type | Thickness (mm) | Brazing material | | | |
| 106 | S21 | U1 | 0.040 | R1 | 4 × 10$^3$ | x | ○ |
| 107 | S22 | U1 | 0.040 | R1 | 4 × 10$^3$ | — | — |
| 108 | S23 | U1 | 0.040 | R1 | 4 × 10$^3$ | x | ○ |
| 109 | S24 | U1 | 0.040 | R1 | 4 × 10$^3$ | — | — |
| 110 | S25 | U1 | 0.040 | R1 | 4 × 10$^3$ | — | — |
| 111 | S26 | U1 | 0.040 | R1 | 4 × 10$^3$ | — | — |
| 112 | S27 | U1 | 0.040 | R1 | 4 × 10$^3$ | — | — |
| 113 | S28 | U1 | 0.040 | R1 | 4 × 10$^3$ | — | — |

*Perforating corrosion: did not occur; ○, occurred; x

TABLE 17

| | | Combination | | | Number of Si particles in sacrificial anode material per 1 mm$^2$ | Corrosion resistance evaluation 1* | Corrosion resistance evaluation 2* |
|---|---|---|---|---|---|---|---|
| | | Sacrificial anode material | | | | | |
| Test material | Core material | Type | Thickness (mm) | Brazing material | | | |
| 114 | S29 | U1 | 0.040 | R1 | 4 × 10$^3$ | — | — |
| 115 | S30 | U1 | 0.040 | R1 | 4 × 10$^3$ | — | — |
| 116 | S1 | U49 | 0.040 | R1 | 1 × 10$^3$ | ○ | x |
| 117 | S1 | U50 | 0.040 | R1 | 1 × 10$^3$ | — | — |
| 118 | S1 | U51 | 0.040 | R1 | 4 × 10$^3$ | — | — |
| 119 | S1 | U52 | 0.040 | R1 | 4 × 10$^3$ | — | — |
| 120 | S1 | U53 | 0.040 | R1 | 4 × 10$^3$ | x | ○ |
| 121 | S1 | U54 | 0.040 | R1 | 4 × 10$^3$ | x | ○ |
| 122 | S1 | U55 | 0.040 | R1 | 4 × 10$^3$ | — | — |
| 123 | S1 | U56 | 0.040 | R1 | 4 × 10$^3$ | — | — |
| 124 | S1 | U57 | 0.040 | R1 | 4 × 10$^3$ | — | — |
| 125 | S1 | U58 | 0.040 | R1 | 4 × 10$^3$ | — | — |
| 126 | S1 | U59 | 0.040 | R1 | 4 × 10$^3$ | — | — |
| 127 | S1 | U60 | 0.040 | R1 | 4 × 10$^3$ | x | ○ |
| 128 | S1 | U1 | 0.040 | R9 | 4 × 10$^3$ | — | — |
| 129 | S1 | U1 | 0.040 | R10 | 4 × 10$^3$ | — | — |

*Perforating corrosion: did not occur; ○, occurred x

TABLE 18

| Test material | Core material | Combination Sacrificial anode material Type | Thickness (mm) | Brazing material | Number of Si particles in sacrificial anode material per 1 mm$^2$ | Corrosion resistance evaluation 1* | Corrosion resistance evaluation 2* |
|---|---|---|---|---|---|---|---|
| 130 | S3 | U61 | 0.040 | R1 | $1 \times 10^3$ | ○ | x |
| 131 | S3 | U62 | 0.040 | R1 | $1 \times 10^4$ | — | — |
| 132 | S3 | U63 | 0.040 | R1 | $4 \times 10^3$ | x | ○ |
| 133 | S3 | U64 | 0.040 | R1 | $4 \times 10^3$ | x | ○ |
| 134 | S3 | U65 | 0.040 | R1 | $4 \times 10^3$ | — | — |
| 135 | S3 | U66 | 0.040 | R1 | $4 \times 10^3$ | — | — |
| 136 | S3 | U67 | 0.040 | R1 | $4 \times 10^3$ | x | ○ |
| 137 | S3 | U68 | 0.040 | R1 | $4 \times 10^3$ | x | ○ |
| 138 | S3 | U69 | 0.040 | R1 | $4 \times 10^3$ | — | — |
| 139 | S3 | U70 | 0.040 | R1 | $4 \times 10^3$ | — | — |
| 140 | S3 | U71 | 0.040 | R1 | $4 \times 10^3$ | — | — |
| 141 | S3 | U72 | 0.040 | R1 | $4 \times 10^3$ | — | — |
| 142 | S3 | U73 | 0.040 | R1 | $4 \times 10^3$ | x | ○ |
| 143 | S3 | U74 | 0.040 | R1 | $4 \times 10^3$ | x | ○ |
| 144 | S3 | U1 | 0.040 | R9 | $4 \times 10^3$ | — | — |
| 145 | S3 | U1 | 0.040 | R10 | $4 \times 10^3$ | — | — |

*Perforating corrosion: did not occur; ○, occurred; x

As shown in Tables 16–18, test materials which did not satisfy the conditions according to the present invention were inferior in either corrosion resistance or brazability. A test material No. 106 exhibited inferior corrosion resistance due to the low Mn content in the core material. Because a test material No. 107 contained a large amount of Mn in the core material, coarse compounds were produced at the time of casting, whereby a sound sheet was not produced due to impaired rolling workability. A test material No. 108 exhibited inferior corrosion resistance due to the low Cu content in the core material. Because test materials No. 109, 110, and 111 contained a large amount of Cu, Si, and Mg in the core material, respectively, local fusion occurred at the interface between the core material and the brazing material at the time of brazing due to the decreased melting point of the core material. Because test materials No. 112, 113, 114, and 115 contained a large amount of Ti, Cr, Zr, and B in the core material, respectively, a sound sheet was not produced due to decreased workability.

A test material No. 116 exhibited inferior erosion-corrosion resistance due to the low Si content in the sacrificial anode material. Because a test material No. 117 contained a large amount of Si in the sacrificial anode material, a sound sheet was not produced due to inferior rolling workability. Because test materials Nos. 118 and 119 contained a large amount of In and Sn in the sacrificial anode material, respectively, a sound sheet was not produced due to inferior rolling workability.

Test materials Nos. 120 and 121 exhibited inferior corrosion resistance due to the high Mg content and the high Cu content in the sacrificial anode material, respectively. Because test materials Nos. 122, 123, 124, and 125 contained a large amount of Cr, Ti, Zr, and B in the sacrificial anode material, respectively, coarse compounds were produced at the time of casting, whereby a sound sheet was not produced due to impaired rolling workability. Test materials Nos. 126 and 127 exhibited inferior corrosion resistance due to the low Fe content and the high Fe content in the sacrificial anode material, respectively. A test material No. 128 exhibited inferior brazability due to the low Si content in the brazing material. A test material No. 129 melted during heating for brazing due to the high Si content in the brazing material.

A test material No. 130 exhibited inferior erosion-corrosion resistance due to the low Si content in the sacrificial anode material. Because a test material No. 131 contained a large amount of Si in the sacrificial anode material, a sound sheet was not produced due to inferior rolling workability. Test materials Nos. 132 and 133 exhibited inferior corrosion resistance due to the low Zn content and the high Zn content in the sacrificial anode material, respectively.

Because test materials Nos. 134 and 135 contained a large amount of In and Sn in the sacrificial anode material, respectively, a sound sheet was not produced due to inferior rolling workability. Test materials Nos. 136 and 137 exhibited inferior corrosion resistance due to the high Mg content of and the high Cu content in the sacrificial anode material, respectively. Because test materials Nos. 138, 139, 140, and 141 contained a large amount of Cr, Ti, Zr, and B in the sacrificial anode material, respectively, coarse compounds were produced at the time of casting, whereby a sound sheet was not produced due to impaired rolling workability. Test materials Nos. 142 and 143 exhibited inferior corrosion resistance due to the low Fe content and the high Fe content in the sacrificial anode material, respectively. A test material No. 144 exhibited inferior brazability due to the low Si content in the brazing material. A test material No. 145 melted when heated for brazing due to the high Si content in the brazing material.

The aluminum alloy clad pipe of the present invention will be described below by the use of the example and comparative example. The example and comparative example illustrate a three-layered clad pipe consisting of an inner layer (sacrificial anode material layer), outer layer (core material layer), and outermost layer (sacrificial anode material layer). In the present invention, a heat exchanger can be manufactured as a three-layered clad pipe consisting of the inner layer, outer layer, and outermost layer. The present invention is applied to either the two-layered clad pipe or the three-layered clad pipe according to the embodiment.

Example 2

An aluminum alloy for the core material layer with a composition shown in Table 19 and an aluminum alloy for the inner layer (sacrificial anode material layer) with a composition shown in Table 20 were cast into billets by continuous casting. The aluminum alloy billet for the core material layer was homogenized and cut in a circle, and the aluminum alloy billet for the inner layer was cut in a circle into sleeves with a predetermined shape. The aluminum alloy sleeve for the inner layer was inserted into the aluminum alloy sleeve for the core material layer as shown in FIG. 1. An aluminum alloy for the outermost layer (sacrificial anode material layer) with a composition shown in Table 21 was cast by continuous casting and rolled into a sheet with a predetermined thickness by hot rolling. The sheet was wound around the aluminum alloy sleeve for the core material layer, and a joint of the sheet was joined by MIG welding to form a billet for extrusion. This billet was extruded and reduced to provide a clad pipe with a thickness of 1.0 mm and an outer diameter of 15 mm. The thickness of the inner layer and the outermost layer of the clad pipe was 0.03–0.20 mm and 0.03–0.20 mm, respectively.

A corrosive solution was circulated inside the resulting aluminum alloy clad pipe (test material) and a corrosion test was performed according to the following methods to evaluate corrosion resistance. The results are shown in Tables 22–24.

(1) Corrosion Test 1

An aqueous solution including 195 ppm of $Cl^-$, 60 ppm of $SO_4^{2-}$, 21 ppm of $Cu^+$, and 30 ppm of $Fe^{3+}$ was circulated inside the piping at a flow rate of 2 m/second. A heat cycle of heating at 88° C. for 8 hours and cooling to hold at 25° C. for 16 hours was repeated 90 times to evaluate corrosion resistance of the inner layer (sacrificial anode material layer) according to the occurrence of perforating corrosion (did not occur: ○, occurred: X).

(2) Corrosion Test 2

A commercially available coolant (pH was adjusted to 10 with NaOH) was circulated in the piping at a flow rate of 10 m/second. After cooling, a heat cycle of heating at 88° C. for 8 hours and cooling to hold at 25° C. for 16 hours was repeated 20 times to evaluate corrosion resistance of the inner layer (sacrificial anode material layer) according to the occurrence of perforating corrosion (did not occur: ○, occurred: X).

(3) Corrosion Test 3

Corrosion resistance of the outermost layer (sacrificial anode material layer) was evaluated by carrying out a CASS test for 2000 hours according to JIS H8681.

TABLE 19

| Core material layer | Composition (wt %) | | | | |
| --- | --- | --- | --- | --- | --- |
| | Mn | Cu | Si | Fe | Other |
| s1 | 1.20 | — | 0.30 | 0.30 | |
| s2 | 1.20 | 0.15 | 0.30 | 0.30 | |
| s3 | 0.85 | 0.15 | 0.30 | 0.30 | |
| s4 | 1.45 | 0.15 | 0.30 | 0.30 | |
| s5 | 1.20 | 0.12 | 0.30 | 0.30 | |
| s6 | 1.20 | 0.28 | 0.30 | 0.30 | |
| s7 | 0.40 | 0.15 | 0.30 | 0.30 | |
| s8 | 1.80 | 0.15 | 0.30 | 0.30 | |
| s9 | 1.20 | 0.07 | 0.30 | 0.30 | |
| s10 | 1.20 | 0.48 | 0.30 | 0.30 | |
| s11 | 1.20 | 0.15 | 0.30 | 0.30 | Ti 0.15 |
| s12 | 1.20 | 0.15 | 0.30 | 0.30 | Cr 0.10 |
| s13 | 1.20 | 0.15 | 0.30 | 0.30 | Zr 0.15 |
| s14 | 1.20 | 0.15 | 0.30 | 0.30 | B 0.05 |
| s15 | 1.20 | 0.15 | 0.30 | 0.30 | Ti 0.15 B 0.05 |
| s16 | 1.20 | 0.15 | 0.30 | 0.30 | Cr 0.10 Zr 0.15 |

TABLE 20

| Inner layer | Composition (wt %) | | | |
| --- | --- | --- | --- | --- |
| | Si | Fe | Zn | Other |
| u1 | 8.00 | 0.30 | — | |
| u2 | 8.00 | 0.30 | 2.00 | |
| u3 | 6.10 | 0.30 | 2.00 | |
| u4 | 8.30 | 0.30 | 2.00 | |
| u5 | 8.00 | 0.30 | 1.50 | |
| u6 | 8.00 | 0.30 | 4.80 | |
| u7 | 3.10 | 0.30 | 2.00 | |
| u8 | 11.50 | 0.30 | 2.00 | |
| u9 | 8.00 | 0.30 | 1.10 | |
| u10 | 8.00 | 0.30 | 9.50 | |
| u11 | 8.00 | 1.00 | 2.00 | |
| u12 | 8.00 | 0.30 | 2.00 | In 0.02 |
| u13 | 8.00 | 0.30 | 2.00 | Sn 0.02 |
| u14 | 8.00 | 0.30 | 2.00 | Cu 0.03 |
| u15 | 8.00 | 0.30 | 2.00 | Cr 0.10 |
| u16 | 8.00 | 0.30 | 2.00 | Ti 0.10 |
| u17 | 8.00 | 0.30 | 2.00 | Zr 0.10 |
| u18 | 8.00 | 0.30 | 2.00 | B 0.05 |

TABLE 21

| Outermost layer | Composition (wt %) | | | |
| --- | --- | --- | --- | --- |
| | Si | Fe | Zn | Other |
| U101 | 0.15 | 0.30 | — | |
| U102 | 0.15 | 0.30 | — | In 0.02 |
| U103 | 0.15 | 0.30 | — | Sn 0.02 |
| U104 | 0.15 | 0.30 | — | Cu 0.03 |
| U105 | 0.15 | 0.30 | — | Cr 0.10 |
| U106 | 0.15 | 0.30 | — | Ti 0.10 |
| U107 | 0.15 | 0.30 | — | Zr 0.10 |
| U108 | 0.15 | 0.30 | — | B 0.05 |
| U109 | 0.15 | 0.30 | 1.00 | |
| U110 | 0.15 | 0.30 | 0.50 | |
| U111 | 0.15 | 0.30 | 1.50 | |
| U112 | 0.15 | 0.30 | 0.30 | |
| U113 | 0.15 | 0.30 | 3.00 | |
| U114 | 0.15 | 0.30 | 1.00 | In 0.02 |
| U115 | 0.15 | 0.30 | 1.00 | Sn 0.02 |
| U116 | 0.15 | 0.30 | 1.00 | Cu 0.03 |
| U117 | 0.15 | 0.30 | 1.00 | Cr 0.10 |
| U118 | 0.15 | 0.30 | 1.00 | Ti 0.10 |
| U119 | 0.15 | 0.30 | 1.00 | Zr 0.10 |
| U120 | 0.15 | 0.30 | 1.00 | B 0.05 |

TABLE 22

| Test material | Inner layer Type | Inner layer Thickness (mm) | Core material layer | Outer- most layer | Number of Si particles in inner layer per 1 mm$^2$ | Corrosion test 1* | Corrosion test 2* | Corrosion test 3* |
|---|---|---|---|---|---|---|---|---|
| 1 | u1 | 0.100 | s2 | U119 | $6 \times 10^3$ | ○ | ○ | ○ |
| 2 | u2 | 0.030 | s2 | U119 | $6 \times 10^3$ | ○ | ○ | ○ |
| 3 | u2 | 0.100 | s2 | U119 | $6 \times 10^3$ | ○ | ○ | ○ |
| 4 | u2 | 0.100 | s2 | U119 | $6 \times 10^3$ | ○ | ○ | ○ |
| 5 | u3 | 0.100 | s2 | U119 | $5 \times 10^3$ | ○ | ○ | ○ |
| 6 | u4 | 0.100 | s2 | U119 | $6 \times 10^3$ | ○ | ○ | ○ |
| 7 | u5 | 0.100 | s2 | U119 | $6 \times 10^3$ | ○ | ○ | ○ |
| 8 | u6 | 0.100 | s2 | U119 | $6 \times 10^3$ | ○ | ○ | ○ |
| 9 | u7 | 0.100 | s2 | U119 | $3 \times 10^3$ | ○ | ○ | ○ |
| 10 | u8 | 0.100 | s2 | U119 | $8 \times 10^3$ | ○ | ○ | ○ |
| 11 | u9 | 0.100 | s2 | U119 | $6 \times 10^3$ | ○ | ○ | ○ |
| 12 | u10 | 0.100 | s2 | U119 | $6 \times 10^3$ | ○ | ○ | ○ |
| 13 | u11 | 0.100 | s2 | U119 | $6 \times 10^3$ | ○ | ○ | ○ |
| 14 | u12 | 0.100 | s2 | U119 | $6 \times 10^3$ | ○ | ○ | ○ |
| 15 | u13 | 0.100 | s2 | U119 | $6 \times 10^3$ | ○ | ○ | ○ |
| 16 | u14 | 0.100 | s2 | U119 | $6 \times 10^3$ | ○ | ○ | ○ |
| 17 | u15 | 0.100 | s2 | U119 | $6 \times 10^3$ | ○ | ○ | ○ |
| 18 | u16 | 0.100 | s2 | U119 | $6 \times 10^3$ | ○ | ○ | ○ |
| 19 | u17 | 0.100 | s2 | U119 | $6 \times 10^3$ | ○ | ○ | ○ |
| 20 | u18 | 0.100 | s2 | U119 | $6 \times 10^3$ | ○ | ○ | ○ |

*Perforating corrosion: did not occur; ○, occurred; x

TABLE 23

| Test material | Inner layer Type | Inner layer Thickness (mm) | Core material layer | Outer- most layer | Number of Si particles in inner layer per 1 mm$^2$ | Corrosion test 1* | Corrosion test 2* | Corrosion test 3* |
|---|---|---|---|---|---|---|---|---|
| 21 | u2 | 0.100 | s1 | U109 | $6 \times 10^3$ | ○ | ○ | ○ |
| 22 | u2 | 0.100 | s3 | U109 | $6 \times 10^3$ | ○ | ○ | ○ |
| 23 | u2 | 0.100 | s4 | U109 | $6 \times 10^3$ | ○ | ○ | ○ |
| 24 | u2 | 0.100 | s5 | U109 | $6 \times 10^3$ | ○ | ○ | ○ |
| 25 | u2 | 0.100 | s6 | U109 | $6 \times 10^3$ | ○ | ○ | ○ |
| 26 | u2 | 0.100 | s7 | U109 | $6 \times 10^3$ | ○ | ○ | ○ |
| 27 | u2 | 0.100 | s8 | U109 | $6 \times 10^3$ | ○ | ○ | ○ |
| 28 | u2 | 0.100 | s9 | U109 | $6 \times 10^3$ | ○ | ○ | ○ |
| 29 | u2 | 0.100 | s10 | U109 | $6 \times 10^3$ | ○ | ○ | ○ |
| 30 | u2 | 0.100 | s11 | U109 | $6 \times 10^3$ | ○ | ○ | ○ |
| 31 | u2 | 0.100 | s12 | U109 | $6 \times 10^3$ | ○ | ○ | ○ |
| 32 | u2 | 0.100 | s13 | U109 | $6 \times 10^3$ | ○ | ○ | ○ |
| 33 | u2 | 0.100 | s14 | U109 | $6 \times 10^3$ | ○ | ○ | ○ |
| 34 | u2 | 0.100 | s15 | U109 | $6 \times 10^3$ | ○ | ○ | ○ |
| 35 | u2 | 0.100 | s16 | U109 | $6 \times 10^3$ | ○ | ○ | ○ |

*Perforating corrosion: did not occur; ○, occurred; x

TABLE 24

| Test material | Inner layer Type | Inner layer Thickness (mm) | Core material layer | Outer- most layer | Number of Si particles in inner layer per 1 mm$^2$ | Corrosion test 1* | Corrosion test 2* | Corrosion test 3* |
|---|---|---|---|---|---|---|---|---|
| 36 | u2 | 0.100 | s2 | U101 | $6 \times 10^3$ | ○ | ○ | ○ |
| 37 | u2 | 0.100 | s2 | U102 | $6 \times 10^3$ | ○ | ○ | ○ |
| 38 | u2 | 0.100 | s2 | U103 | $6 \times 10^3$ | ○ | ○ | ○ |
| 39 | u2 | 0.100 | s2 | U104 | $6 \times 10^3$ | ○ | ○ | ○ |
| 40 | u2 | 0.100 | s2 | U105 | $6 \times 10^3$ | ○ | ○ | ○ |
| 41 | u2 | 0.100 | s2 | U106 | $6 \times 10^3$ | ○ | ○ | ○ |
| 42 | u2 | 0.100 | s2 | U107 | $6 \times 10^3$ | ○ | ○ | ○ |

TABLE 24-continued

| Test material | Combination Inner layer Type | Thickness (mm) | Core material layer | Outer-most layer | Number of Si particles in inner layer per 1 mm² | Corrosion test 1* | Corrosion test 2* | Corrosion test 3* |
|---|---|---|---|---|---|---|---|---|
| 43 | u2 | 0.100 | s2 | U108 | 6 × 10³ | ○ | ○ | ○ |
| 44 | u2 | 0.100 | s2 | U110 | 6 × 10³ | ○ | ○ | ○ |
| 45 | u2 | 0.100 | s2 | U111 | 6 × 10³ | ○ | ○ | ○ |
| 46 | u2 | 0.100 | s2 | U112 | 6 × 10³ | ○ | ○ | ○ |
| 47 | u2 | 0.100 | s2 | U113 | 6 × 10³ | ○ | ○ | ○ |
| 48 | u2 | 0.100 | s2 | U114 | 6 × 10³ | ○ | ○ | ○ |
| 49 | u2 | 0.100 | s2 | U115 | 6 × 10³ | ○ | ○ | ○ |
| 50 | u2 | 0.100 | s2 | U116 | 6 × 10³ | ○ | ○ | ○ |
| 51 | u2 | 0.100 | s2 | U117 | 6 × 10³ | ○ | ○ | ○ |
| 52 | u2 | 0.100 | s2 | U118 | 6 × 10³ | ○ | ○ | ○ |
| 53 | u2 | 0.100 | s2 | U119 | 6 × 10³ | ○ | ○ | ○ |
| 54 | u2 | 0.100 | s2 | U120 | 6 × 10³ | ○ | ○ | ○ |

*Perforating corrosion: did not occur; ○, occurred; x

As shown in Tables 22–24, test materials Nos. 1–54 according to the present invention produced no through-holes in the corrosion test and exhibited excellent corrosion resistance and excellent erosion-corrosion resistance. These test materials also exhibited superior extrusion workability and did not hinder extrusion.

Comparative Example 2

An aluminum alloy for the core material layer with a composition shown in Table 25 and an aluminum alloy for the inner layer (sacrificial anode material layer) with a composition shown in Table 26 were cast into billets by continuous casting, and an aluminum alloy for the outermost layer (sacrificial anode material layer) having a composition shown in Table 27 was cast by continuous casting to provide a clad pipe with a thickness of 1.0 mm and an outside diameter of 15 mm by the same method as in Example 2. Corrosion resistance of the resulting clad pipe was evaluated according to the same method as in Example 2. The evaluation results are shown in Tables 28–29. The thickness of the inner layer and the outermost layer of the clad pipe was 0.03–0.20 mm and 0.03–0.20 mm, respectively, as in Example 2.

TABLE 25

| Core material layer | Composition (wt %) | | | | |
|---|---|---|---|---|---|
| | Mn | Cu | Si | Fe | Other |
| s17 | 0.10 | 0.15 | 0.30 | 0.30 | |
| s18 | 2.20 | 0.15 | 0.30 | 0.30 | |
| s19 | 1.20 | 0.20 | 0.30 | 0.30 | |
| s20 | 1.20 | 1.20 | 0.30 | 0.30 | |
| s21 | 1.20 | 0.12 | 0.30 | 0.30 | Ti 0.40 |
| s22 | 1.20 | 0.28 | 0.30 | 0.30 | Cr 0.60 |
| s23 | 1.20 | 0.15 | 0.30 | 0.30 | Zr 0.40 |
| s24 | 1.20 | 0.15 | 0.30 | 0.30 | B 0.20 |

TABLE 26

| Inner layer | Composition (wt %) | | | |
|---|---|---|---|---|
| | Si | Fe | Zn | Other |
| u19 | 2.00 | 0.30 | 2.00 | |
| u20 | 13.00 | 0.30 | 2.00 | |
| u21 | 8.00 | 0.30 | 12.00 | |
| u22 | 8.00 | 0.30 | 2.00 | In 0.10 |
| u23 | 8.00 | 0.30 | 2.00 | Sn 0.10 |
| u24 | 8.00 | 0.30 | 2.00 | Cu 0.10 |
| u25 | 8.00 | 1.50 | 2.00 | |
| u26 | 8.00 | 0.30 | 2.00 | Cr 0.40 |
| u27 | 8.00 | 0.30 | 2.00 | Ti 0.40 |
| u28 | 8.00 | 0.30 | 2.00 | Zr 0.40 |
| u29 | 8.00 | 0.30 | 2.00 | B 0.20 |

TABLE 27

| Outermost layer | Composition (wt %) | | | |
|---|---|---|---|---|
| | Si | Fe | Zn | Other |
| U121 | 0.15 | 0.30 | 4.00 | |
| U122 | 0.15 | 0.30 | 1.00 | In 0.10 |
| U123 | 0.15 | 0.30 | 1.00 | Sn 0.10 |
| U124 | 0.15 | 0.30 | 1.00 | Cu 0.10 |
| U125 | 0.15 | 0.30 | 1.00 | Cr 0.40 |
| U126 | 0.15 | 0.30 | 1.00 | Ti 0.40 |
| U127 | 0.15 | 0.30 | 1.00 | Zr 0.40 |
| U128 | 0.15 | 0.30 | 1.00 | B 0.20 |

TABLE 28

| Test material | Inner layer Type | Inner layer Thickness (mm) | Core material layer | Outer-most layer | Number of Si particles in inner layer per 1 mm$^2$ | Corrosion test 1* | Corrosion test 2* | Corrosion test 3* |
|---|---|---|---|---|---|---|---|---|
| 55 | u19 | 0.100 | s2 | U109 | $1 \times 10^3$ | ○ | x | ○ |
| 56 | u20 | 0.100 | s2 | U109 | $1 \times 10^4$ | — | — | — |
| 57 | u21 | 0.100 | s2 | U109 | $6 \times 10^3$ | x | ○ | ○ |
| 58 | u22 | 0.100 | s2 | U109 | $6 \times 10^3$ | — | — | — |
| 59 | u23 | 0.100 | s2 | U109 | $6 \times 10^3$ | — | — | — |
| 60 | u24 | 0.100 | s2 | U109 | $6 \times 10^3$ | x | ○ | ○ |
| 61 | u25 | 0.100 | s2 | U109 | $6 \times 10^3$ | x | ○ | ○ |
| 62 | u26 | 0.100 | s2 | U109 | $6 \times 10^3$ | — | — | — |
| 63 | u27 | 0.100 | s2 | U109 | $6 \times 10^3$ | — | — | — |
| 64 | u28 | 0.100 | s2 | U109 | $6 \times 10^3$ | — | — | — |
| 65 | u29 | 0.100 | s2 | U109 | $6 \times 10^3$ | — | — | — |

*Perforating corrosion: did not occur; ○, occurred; x

TABLE 29

| Test material | Inner layer Type | Inner layer Thickness (mm) | Core material layer | Outer-most layer | Number of Si particles in inner layer per 1 mm$^2$ | Corrosion test 1* | Corrosion test 2* | Corrosion test 3* |
|---|---|---|---|---|---|---|---|---|
| 66 | u2 | 0.100 | s17 | U109 | $6 \times 10^3$ | x | ○ | ○ |
| 67 | u2 | 0.100 | s18 | U109 | $6 \times 10^3$ | — | — | — |
| 68 | u2 | 0.100 | s19 | U109 | $6 \times 10^3$ | x | ○ | ○ |
| 69 | u2 | 0.100 | s20 | U109 | $6 \times 10^3$ | x | ○ | ○ |
| 70 | u2 | 0.100 | s21 | U109 | $6 \times 10^3$ | — | — | — |
| 71 | u2 | 0.100 | s22 | U109 | $6 \times 10^3$ | — | — | — |
| 72 | u2 | 0.100 | s23 | U109 | $6 \times 10^3$ | — | — | — |
| 73 | u2 | 0.100 | s24 | U109 | $6 \times 10^3$ | — | — | — |
| 74 | u2 | 0.100 | s2 | U121 | $6 \times 10^3$ | ○ | ○ | x |
| 75 | u2 | 0.100 | s2 | U122 | $6 \times 10^3$ | — | — | — |
| 76 | u2 | 0.100 | s2 | U123 | $6 \times 10^3$ | — | — | — |
| 77 | u2 | 0.100 | s2 | U124 | $6 \times 10^3$ | ○ | ○ | x |
| 78 | u2 | 0.100 | s2 | U125 | $6 \times 10^3$ | — | — | — |
| 79 | u2 | 0.100 | s2 | U126 | $6 \times 10^3$ | — | — | — |
| 80 | u2 | 0.100 | s2 | U127 | $6 \times 10^3$ | — | — | — |
| 81 | u2 | 0.100 | s2 | U128 | $6 \times 10^3$ | — | — | — |

*Perforating corrosion: did not occur; ○, occurred; x

As shown in Tables 28–29, test materials which did not sfy the conditions according to the present invention were rior in either corrosion resistance or extrusion ability. A test material No. 55 exhibited inferior erosion-corrosion resistance due to the low Si content in the inner layer. Test materials Nos. 57, 60, and 61 exhibited inferior corrosion resistance due to the high Zn content, the high Cu content, and the high Fe content in the inner layer, respectively. Sound test materials were not produced from test materials Nos. 56, 58, 59, 62, 63, 64, and 65 due to inferior extrusion workability because of the high content of Si, In, Sn, Cr, Ti, Zr, and B in the inner layer, respectively.

A test material No. 66 exhibited inferior corrosion resistance due to the low Mn content in the core material layer. A sound test material was not produced from a test material No. 67 due to inferior extrusion workability due to the high Mn content in the core material layer. Test materials Nos. 68 and 69 exhibited inferior corrosion resistance due to the low Cu content and the high Cu content in the inner layer, respectively. Because test materials Nos. 70, 71, 72, and 73 contained a large amount of Ti, Cr, Zr, and B in the core material layer, respectively, a sound sheet was not produced due to inferior extrusion workability.

Test materials Nos. 74 and 77 exhibited inferior corrosion resistance due to the high Zn content and the high Cu content in the outermost layer, respectively. Because test materials Nos. 75, 76, 78, 79, 80, and 81 contained a large amount of In, Sn, Cr, Ti, Zr, and B in the outermost layer, respectively, a sound sheet was not produced due to inferior extrusion workability.

Obviously, numerous modifications and variations of the present invention are possible in light of the above teachings. It is therefore to be understood that, within the scope of the appended claims, the invention may be practiced otherwise than as specifically described herein.

What is claimed is:

1. An aluminum alloy clad material for heat exchangers exhibiting excellent erosion-corrosion resistance which comprises a sacrificial anode material clad on one side of a core material, wherein the core material comprises an Al—Mn alloy and the sacrificial anode material comprises an aluminum alloy comprising 3.0–12.0% of Si and 1.0–10.0% of Zn with the remaining portion consisting of Al and impurities.

2. An aluminum alloy clad sheet for heat exchangers exhibiting excellent erosion-corrosion resistance with a two-layered structure which comprises the aluminum alloy clad material according to claim 1.

3. The aluminum alloy clad sheet for heat exchangers exhibiting excellent erosion-corrosion resistance according to claim 2, wherein the sacrificial anode material further comprises one or more of 0.001–0.05% of In, 0.001–0.05% of Sn, and 3.0% or less of Mg.

4. The aluminum alloy clad sheet for heat exchangers exhibiting excellent erosion-corrosion resistance according to claim 2, wherein the sacrificial anode material further comprises one or more of 0.05% or less of Cu, 0.2% or less of Cr, 0.3% or less of Ti, 0.3% or less of Zr, and 0.1% or less of B.

5. The aluminum alloy clad sheet for heat exchangers exhibiting excellent erosion-corrosion resistance according to claim 2, wherein the Al—Mn alloy for the core material comprises more than 0.3% but 2.0% or less of Mn and either 0.1–1.0% of Cu or 0.1–1.1% of Si, or both, with the remaining portion consisting of Al and impurities.

6. The aluminum alloy clad sheet for heat exchangers exhibiting excellent erosion-corrosion resistance according to claim 5, wherein the Al—Mn alloy for the core material further comprises 0.5% or less of Mg.

7. The aluminum alloy clad sheet for heat exchangers exhibiting excellent erosion-corrosion resistance according to claim 5, wherein the Al—Mn alloy for the core material further comprises one or more of 0.35% or less of Ti, 0.5% or less of Cr, 0.3% or less of Zr, and 0.1% or less of B.

8. The aluminum alloy clad sheet for heat exchangers exhibiting excellent erosion-corrosion resistance according to claim 2, wherein a brazing material of an Al—Si alloy is clad on the side of the core material.

9. The aluminum alloy clad sheet for heat exchangers exhibiting cellent erosion-corrosion resistance according to claim 8, wherein the Al—Si alloy for the brazing material comprises 6.0–13.0% of Si with the remaining portion consisting of Al and impurities.

10. The aluminum alloy clad sheet for heat exchangers exhibiting excellent erosion-corrosion resistance according to claim 9, wherein the Al—Si alloy for the brazing material further comprises one or more of 2.0% or less of Mg, 0.2% or less of Bi, 0.1% or less of Be, 1.0% or less of Ca, and 1.0% or less of Li.

11. The aluminum alloy clad sheet for heat exchangers exhibiting excellent eroqion-corrosion resistance according to claim 2, wherein $2 \times 10^3$–$8 \times 10_3$ Si particles having a particle diameter (circle equivalent diameter) of 0.5–5 µm exist per 1 mm$^2$ in the sacrificial anode material matrix.

12. An aluminum alloy clad material for heat exchangers exhibiting excellent erosion-corrosion resistance which comprises a sacrificial anode material clad on one side of a core material, wherein the core material comprises an Al—Mn alloy and the sacrificial anode material comprises an aluminum alloy comprising 3.0–12.0% of Si, 1.0–10.0% of Zn, and 0.15–1.2% of Fe with the remaining portion consisting of Al and impurities.

13. An aluminum alloy clad sheet for heat exchangers exhibiting excellent erosion-corrosion resistance with a two-layered structure which comprises the aluminum alloy clad material according to claim 12.

14. The aluminum alloy clad sheet for heat exchangers exhibiting excellent erosion-corrosion resistance according to claim 13, wherein the sacrificial anode material further comprises one or more of 0.001–0.05% of In, 0.001–0.05% of Sn and 3.0% or less of Mg.

15. The aluminum alloy clad sheet for heat exchangers exhibiting excellentyerosion-corrosion resistance according to claim 13, wherein the sacrificial anode material further comprises one or more of 0.05% or less of Cu, 0.2% or less of Cr, 0.3% or less of Ti, 0.3% or less of Zr and 0.1% or less of B.

16. The aluminum alloy clad sheet for heat exchangers exhibiting excellent erosion-corrosion resistance according to claim 13, wherein the Al—Mn alloy for the core material comprises more than 0.3% but 2% or less of Mn and either 0.1–1.0% of Cu or 0.1–1.1% of Si, or both, with the remaining portion consisting of Al and impurities.

17. The aluminum alloy clad sheet for heat exchangers exhibiting excellent erosion-corrosion resistance according to claim 16, wherein the Al—Mn alloy for the core material further comprises 0.5% or less of Mg.

18. The aluminum alloy clad sheet for heat exchangers exhibiting excellent erosion-corrosion resistance according to claim 16, wherein the Al—Mn alloy for the core material further comprises one or more of 0.35% or less of Ti, 0.5% or less of Cr, 0.3% or less of Zr and 0.1% or less of B.

19. The aluminum alloy clad sheet for heat exchangers exhibiting excellent erosion-corrosion resistance according to claim 13, wherein a brazing material of an Al—Si alloy is clad on the side of the core material.

20. The aluminum alloy clad sheet for heat exchangers exhibiting excellent erosion-corrosion resistance according to claim 19, wherein the Al—Si alloy for the brazing material comprises 6.0–13.0% of Si with the remaining portion consisting of Al and impurities.

21. The aluminum alloy clad sheet for heat exchangers exhibiting excellent erosion-corrosion resistance according to claim 20, wherein the Al—Si alloy for the brazing material further comprises one or more of 2.0% or less of Mg, 0.2% or less of Bi, 0.1% or less of Be, 1.0% or less of Ca and 1.0% or less of Li.

22. The aluminum alloy clad sheet for heat exchangers exhibiting excellent erosion-corrosion resistance according to claim 13, wherein $2 \times 10^3$–$8 \times 10^3$ Si particles having a particle diameter (circle equivalent diameter) of 0.5–5 µm exist per 1 mm$^3$ in the sacrificial anode material matrix.

23. An aluminum alloy clad pipe manufactured by extrusion having a two-layered structure which comprises the aluminum alloy clad material according to claim 1, wherein an outer layer constituting the outer surface of the clad pipe is formed by the core material and an inner layer constituting the inner surface of the clad pipe is formed by the sacrificial anode material.

24. The aluminum alloy clad pipe according to claim 23, wherein the aluminum alloy for the inner layer further comprises either 0.001–0.05% of In or 0.001–0.05% of Sn, or both.

25. The aluminum alloy clad pipe according to claim 23, wherein the sacrificial anode material further comprises one or more of 0.05% or less of Cu, 0.2% or less of Cr, 0.3% or less of Ti, 0.3% or less of Zr, and 0.1% or less of B.

26. The aluminum alloy clad pipe according to claim 23, wherein the Al—Mn alloy for the outer layer comprises more than 0.3% but 2.0% or less of Mn and 0.05–0.5% of Cu with the remaining portion consisting of Al and impurities.

27. The aluminum alloy clad pipe according to claim 26, wherein the Al—Mn alloy for the outer layer further comprises one or more of 0.35% or less of Ti, 0.5% or less of Cr, 0.3% or less of Zr, and 0.1% or less of B.

28. The aluminum alloy clad pipe according to of claim 23, wherein an outermost layer of pure aluminum is clad on the side of the outer layer of the aluminum alloy clad pipe to provide a three-layered structure.

29. The Aluminum alloy clad pipe according to claim 23, wherein an outermost layer of an aluminum alloy comprising 0.3–3.0% of Zn with the remaining portion consisting of Al and impurities is clad on the side of the outer layer of the aluminum alloy clad pipe to provide a three-layered structure.

30. The aluminum alloy clad pipe according to claim 28, wherein the aluminum for the outermost layer further comprises either 0.001–0.05% of In or 0.001–0.05% of Sn, or both.

31. The aluminum alloy clad pipe according to claim 29, wherein the aluminum alloy for the outermost layer further comprises either 0.001–0.05% of In or 0.001–0.05% of Sn, or both.

32. The aluminum alloy clad pipe according to claim 28, wherein the aluminum for the outermost layer further comprises one or more of 0.05% or less of Cu, 0.2% or less of Cr, 0.3% or less of Ti, 0.3% or less of Zr, and 0.1% or less of B.

33. The aluminum alloy clad pipe according to claim 29, wherein the aluminum alloy for the outermost layer further comprises one or more of 0.05% or less of Cu, 0.2% or less of Cr, 0.3% or less of Ti, 0.3% or less of Zr, and 0.1% or less of B.

34. The aluminum alloy clad pipe according to claim 23, wherein $2\times10^3 8\times10^3$ Si particles having a particle diameter (circle equivalent diameter) of 0.5–5 $\mu$m exists per 1 mm$^2$ in the sacrificial anode material matrix.

35. An aluminum alloy clad pipe manufactured by extrusion having a two-layered structure which comprises the aluminum alloy clad material according to claim 12, wherein an outer layer constituting the outer surface of the clad pipe is formed by the core material and an inner layer constituting the inner surface of the clad pipe is formed by the sacrificial anode material.

36. The aluminum alloy clad pipe according to claim 35, wherein the aluminum alloy for the inner layer further comprises either 0.001–0.05% of In or 0.01–0.05% of Sn, or both.

37. The aluminum alloy clad pipe according to claim 35, wherein the sacrificial anode material further comprises one or more of 0.05% or less of Cu, 0.2% or less of Cr, 0.3% or less of Ti, 0.3% or less of Zr, and 0.1% or less of B.

38. The aluminum alloy clad pipe according to claim 35, wherein the Al—Mn alloy for the outer layer comprises more than 0.3% but 2.0% or less of Mn and 0.05–0.5% of Cu with the remaining portion consisting of Al and impurities.

39. The aluminum alloy clad pipe according to claim 38, wherein the Al—Mn alloy for the outer layer further comprises one or more of 0.35% or less of Ti, 0.5% or less of Cr, 0.3% or less of Zr, and 0.1% or less of B.

40. The aluminum alloy clad pipe according to claim 35, wherein an outermost layer of pure aluminum is clad on the side of the outer layer of the aluminum alloy clad pipe to provide a three-layered structure.

41. The aluminum alloy clad pipe according to claim 35, wherein an outermost layer of an aluminum alloy comprising 0.3–3.0% of Zn with the remaining portion consisting of Al and impurities is clad on the side of the outer layer of the aluminum alloy clad pipe to provide a three-layered structure.

42. The aluminum alloy clad pipe according to claim 40, wherein the aluminum for the outermost layer further comprises either 0.001–0.05% of In or 0.001–0.05% of Sn, or both.

43. The aluminum alloy clad pipe according to claim 41, wherein the aluminum for the outermost layer further comprises either 0.001–0.05% of In or 0.001–0.05% Sn, or both.

44. The aluminum alloy clad pipe according to claim 40, wherein the aluminum for the outermost layer further comprises one or more of 0.05% or less of Cu, 0.2% or less of Cr, 0.3% or less of Ti, 0.3% or less of Zr and 0.1% or less of B.

45. The aluminum alloy clad pipe according to claim 41, wherein the aluminum for the outermost layer further comprises one or more of 0.05% or less of Cu, 0.2% or less of Cr, 0.3% or less of Ti, 0.3% or less of Zr and 0.1% or less of B.

46. The aluminum alloy clad pipe according to claim 35, wherein $2\times10^3 8\times10^3$ Si particles having a particle diameter (circle equivalent diameter) of 0.5–5 $\mu$m exist per 1 mm$^2$ in the sacrificial anode material matrix.

\* \* \* \* \*